(12) United States Patent
Chen

(10) Patent No.: US 7,279,713 B2
(45) Date of Patent: Oct. 9, 2007

(54) BONDING PAD AND METHOD FOR MANUFACTURING THE SAME

(75) Inventor: Kun-Hong Chen, Taipei Hsien (TW)

(73) Assignee: AU Optronics Corp., Hsinchu (TW)

( * ) Notice: Subject to any disclaimer, the term of this patent is extended or adjusted under 35 U.S.C. 154(b) by 0 days.

(21) Appl. No.: 10/434,078

(22) Filed: May 9, 2003

(65) Prior Publication Data
US 2004/0223091 A1    Nov. 11, 2004

(51) Int. Cl.
*H01L 29/04* (2006.01)
(52) U.S. Cl. .................................................. 257/72
(58) Field of Classification Search ............... 257/59, 257/72, 74, 359, 40, E51.022; 438/48
See application file for complete search history.

(56) References Cited

U.S. PATENT DOCUMENTS

| | | | |
|---|---|---|---|
| 5,319,224 A * | 6/1994 | Sakashita et al. ............ 257/203 |
| 6,815,239 B1 * | 11/2004 | Kong et al. .................... 438/25 |
| 6,835,951 B2 * | 12/2004 | Park ............................. 257/40 |
| 2001/0032981 A1 * | 10/2001 | Kong et al. .................... 257/72 |
| 2003/0127652 A1 * | 7/2003 | Park et al. ..................... 257/72 |
| 2003/0197179 A1 * | 10/2003 | Yamazaki et al. ............. 257/59 |
| 2004/0036073 A1 * | 2/2004 | Hong et al. .................... 257/72 |
| 2004/0046175 A1 * | 3/2004 | Takizawa et al. .............. 257/72 |
| 2004/0051103 A1 * | 3/2004 | Hong et al. .................... 257/72 |
| 2004/0207791 A1 * | 10/2004 | Lee et al. ..................... 349/141 |
| 2004/0232420 A1 * | 11/2004 | Lee et al. ..................... 257/59 |
| 2006/0097262 A1 * | 5/2006 | Kim et al. ..................... 257/72 |

* cited by examiner

*Primary Examiner*—Nathan W. Ha
(74) *Attorney, Agent, or Firm*—Troxell Law Office, PLLC

(57) ABSTRACT

A bonding pad structure on marginal area of a substrate of a liquid crystal display comprises a plurality of bonding pads and insulations. The bonding pads defined at the time of forming a gate on pixel area of the substrate are located on marginal area of the substrate, whereas the insulations defined at the time of forming a dielectric layer to cover the gate are sandwiched between the bonding pads.

11 Claims, 5 Drawing Sheets

BONDING PAD AND METHOD FOR MANUFACTURING THE SAME

FIELD OF THE INVENTION

The present invention relates to a bonding pad structure, and more particularly, to a bonding pad structure formed over the marginal area of a transparent substrate and a method for manufacturing the same.

BACKGROUND OF THE INVENTION

COG (chip on glass) refers to a technology of flip chip. Metal bumps of a driver IC are mounted directly to an indium tin oxide (ITO) layer that is attached on a plurality of bonding pads fabricated on a same transparent substrate of an LCD panel, using an anisotropic conductive film (ACF) as a vehicle for bonding the chip to the transparent substrate.

Referring to FIG. 1, a cross-sectional view of an LCD structure is shown. A silicon-based island 14 with a source region 14s and a drain region 14d formed in respective ends is disposed on pixel area of a glass substrate 12. Between the source region 14s and drain region 14d sandwiched a channel region 14c. A gate oxide film 16 is formed on the glass substrate 12 and covers the silicon-based island 14. A gate 18 is arranged on a portion of the gate oxide film 16 over the channel region 14c. The gate 18, gate oxide film 16 and silicon-based island 14 comprise a thin film transistor (TFT).

An interlayer dielectric (ILD) layer 20 is disposed on the glass substrate 12 and covers the TFT. First contact holes 21 are formed in the ILD layer 20 and gate oxide film 16 to expose portions of upper surfaces of the source region 14s and drain region 14d, respectively. A plurality of interconnections 22 and bonding pads 23 are formed simultaneously in the respective first contact holes 21 over pixel area of the glass substrate 12 and on the ILD layer 20 over marginal area of the glass substrate 12. The interconnections 22 are formed to electrically connect to the source region 14s and drain region 14d, whereas the bonding pads 23 are provided for metal bumps of COG.

A passivation layer 24 is formed on the ILD layer 20 and covers the interconnections 22 and bonding pads 23. A second contact hole 25 and a plurality of bonding openings 31 are formed simultaneously in the passivation layer 24 over pixel area and marginal area of the glass substrate 12, respectively. The second contact hole 25 is formed to expose a portion of upper surface of the interconnection 22 that is in direct contact with the source region 14s. The bonding openings 31 are formed to expose upper surfaces of the bonding pads 23. A planarizing film 28 is formed on the passivation layer 24 over pixel area of the glass substrate 12 and fills the second contact hole 25.

A third contact hole 30 is fabricated in the planarizing film 28. Still referring to FIG. 1, the third contact hole 30 is located in the second contact hole 25. It is noted that side walls of the second contact hole 25 is completely covered by the planarizing film 280, whereas a portion of the bottom surface of the second contact hole 25 is exposed.

Referring to FIG. 2, a pixel electrode 32 is attached on surfaces of the planarizing film 28, the third contact hole 30 and the bonding pads 23.

FIGS. 3 to 5 show steps of manufacturing the LCD structure mentioned above. Referring to FIG. 3, a silicon-based island 14 is defined on pixel area of a glass substrate 12. Next, both ends of the silicon-based island 14 are doped to form a source region 14s and a drain region 14d therein, respectively. A gate oxide film 16 is then formed by chemical vapor deposition (CVD) on the glass substrate 12 and covers the silicon-based island 14. A gate 18 is formed on a portion of the gate oxide film 16 over the region 14c. The gate 18, gate oxide film 16 and silicon-based island 14 comprise a TFT.

Referring to FIG. 4, an ILD layer 20 is deposited on the glass substrate 12 and covers the TFT. Next, a plurality of first contact holes 21 are formed in the ILD layer 20 and gate oxide film 16 to expose portions of upper surfaces of the source region 14s and drain region 14d, respectively. A conductive layer is then sputtered on the ILD layer 20 and fills the first contact holes 21. Thereafter, the conductive layer is patterned to form a plurality of interconnections 22 and bonding pads 23 simultaneously in the first contact holes 21 over pixel area of the glass substrate 12 and on the ILD layer 20 over marginal area of the glass substrate 12, respectively. The interconnections 22 are used to electrically connect to the source region 14s and drain region 14d, whereas the bonding pads 23 are provided for metal bumps of the COG.

Referring to FIG. 5, a passivation layer 24 is deposited on the ILD layer 20, covering the interconnecting layer 22 and bonding pads 23. Then, a second contact hole 25 is formed in the passivation layer 24 over the interconnecting layer 22 directly contact with the source region 14s to expose a part of upper surface of the interconnecting layer 22. At the same time, a plurality of bonding openings 31 are formed in the passivation layer 24 over the bonding pads 23 to expose upper surfaces thereof. Thereafter, a planarizing film 28 is fabricated on the passivation layer 24 over pixel area of the glass substrate 12.

Still referring to FIG. 5, a third contact hole 30 is formed in the planarizing film 28 to expose a part of bottom surface of the second contact hole 25. It is noted that side walls of the second contact hole 25 are completely covered by the planarizing film 28. In one preferred embodiment, the third contact hole 30 is formed by development, etching or the combination thereof.

Referring back to FIG. 2, a pixel electrode 32 is formed on the planarizing film 28 and bonding pads 23, and covers the surface of the third contact hole 30, simultaneously.

In the prior art, the passivation layer 24 can be substituted for the planarizing film 28, thus saving procedures of forming the passivation layer 24 and the second contact hole 25. However, when metal bumps of COG are in bad contact with the bonding pads 23 insulated by the planarizing film 28, it is necessary to remove the COG from the bonding pads 23 and clean the bonding pads with a solution. After the cleaning, metal bumps of the COG are re-mounted onto the pixel electrode 32 over the bonding pads 23. These steps are called re-work process.

In the re-work process, the planarizing film 28 used to insulate the bonding pads 23 tends to react with the solution. Therefore, the occurrence of the planarizing film 28 peeling off from the ILD layer 16 is elevated.

SUMMARY OF THE INVENTION

The present invention provides a bonding pad structure and a method for manufacturing the same. Moreover, the present invention provides a method for forming a plurality of gates and bonding pads simultaneously over pixel area and marginal area of a glass substrate, respectively.

A thin film transistor (TFT) is fabricated on pixel area of a glass substrate. At the time of forming a gate of the TFT, a plurality of bonding pads are defined on marginal area of the glass substrate. Next, an ILD layer is deposited on the glass substrate, covering the TFT and bonding pads. Thereafter, a plurality of first contact holes and bonding openings are formed simultaneously in the ILD layer to expose a part of upper surfaces of the TFT and bonding pads, respectively. An interconnecting layer is then formed in the first contact holes to electrically connect to the TFT. A planarizing film is formed on the ILD layer over pixel area of the glass substrate and covers the interconnecting layer. Subsequently, a second contact hole is formed in the planarizing film to expose a portion of upper surface of the interconnecting layer. A pixel electrode is formed to attach surfaces of structures over pixel area and marginal area of the glass substrate. Lastly, the pixel electrode over marginal area of the glass substrate is patterned to remove portions thereof over the ILD layer.

BRIEF DESCRIPTION OF THE DRAWINGS

The foregoing aspects and many of the attendant advantages of this invention will become more readily appreciated and understood by referencing the following detailed description in conjunction with the accompanying drawings, wherein.

DESCRIPTION OF THE PERFERRED EMBODIMENTS

Figure 1:
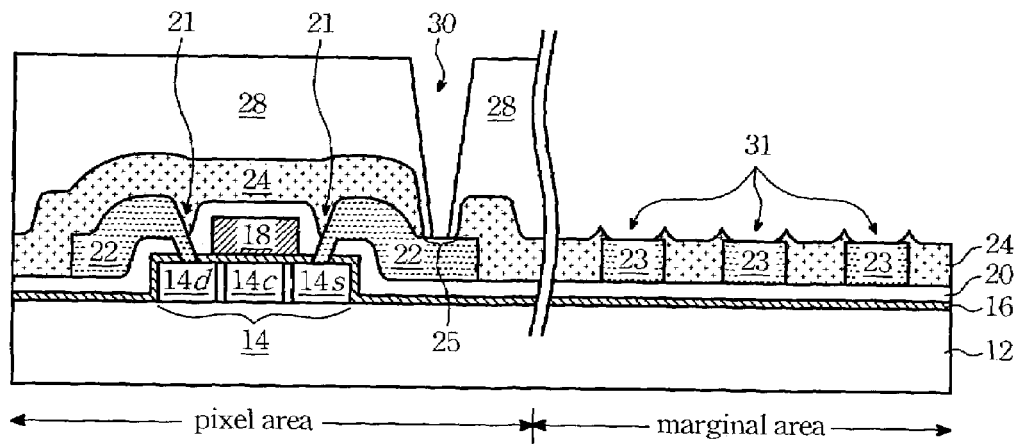
FIG. 1 is a sectional view of an LCD structure in accordance with the prior art.
Figure 2:
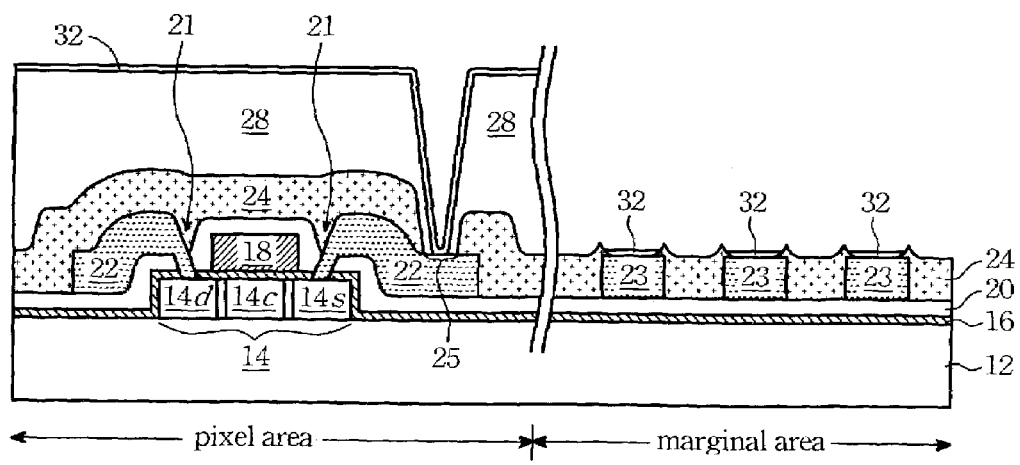
FIG. 2 is a sectional view of an LCD structure in accordance with the prior art.
Figure 3:
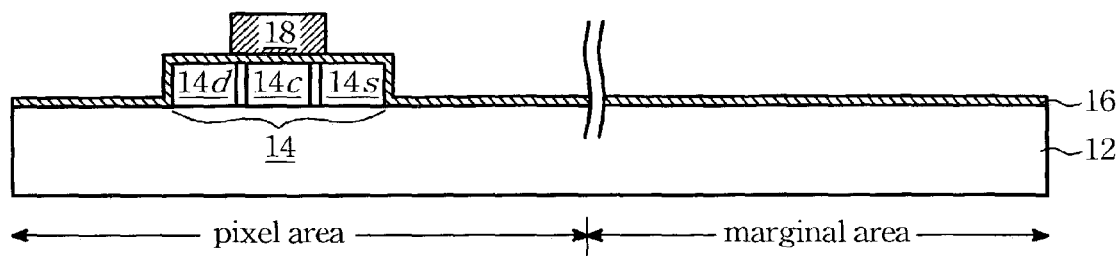
FIGS. 3-5 show a method for making an LCD in accordance with the prior art.
Figure 4:
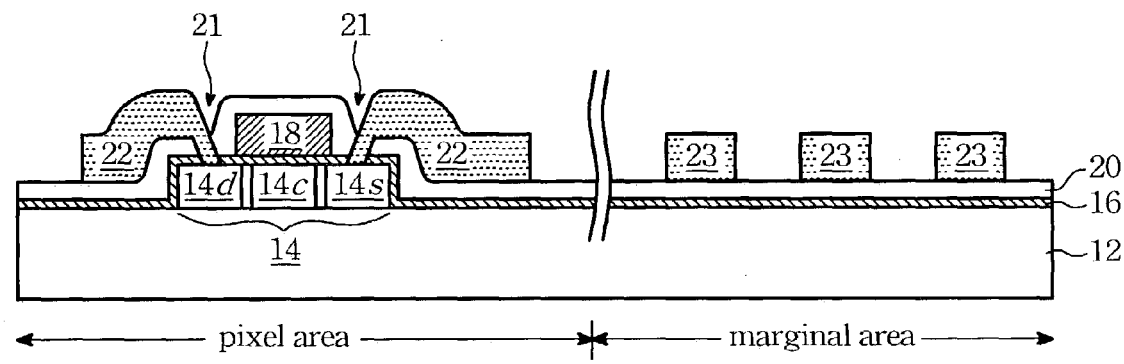
Figure 5:
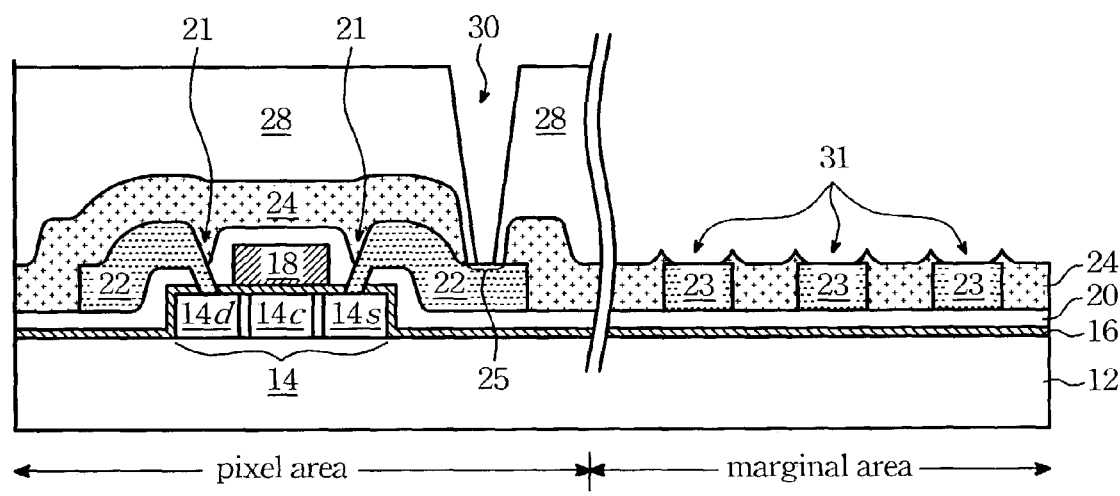
Figure 6:
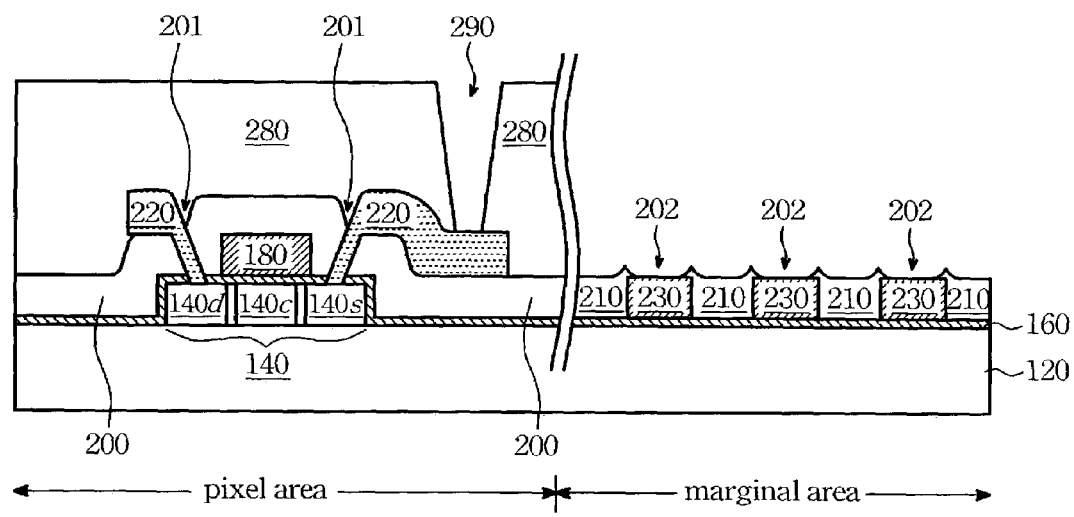
FIG. 6 is a sectional view of an LCD structure in accordance with the present invention.

The invention discloses a bonding pad structure fabricated on marginal area of a glass substrate and a method for manufacturing the same. The preferred embodiment of the present invention is now described in detail below.

A first dielectric layer 160 is formed on the glass substrate 120 and covers the silicon-based island 140. Herein the first dielectric layer is a gate oxide film. A gate 180 is arranged on a portion of the first dielectric layer 160 over the channel region 140c. The gate 180, the first dielectric layer 160 and the silicon-based island 140 comprise a thin film transistor (TFT).

An second dielectric layer 200(herein means as an interlayer dielectric (ILD) layer 200) is disposed on the glass substrate 120 and covers the TFT and bonding pads 230.

A plurality of first contact holes 210 are formed in the ILD layer 200 and the first dielectric layer 160 over pixel area of the glass substrate 120 to expose portions of upper surfaces of the source region 140s and drain region 140d, respectively.

Figure 7:
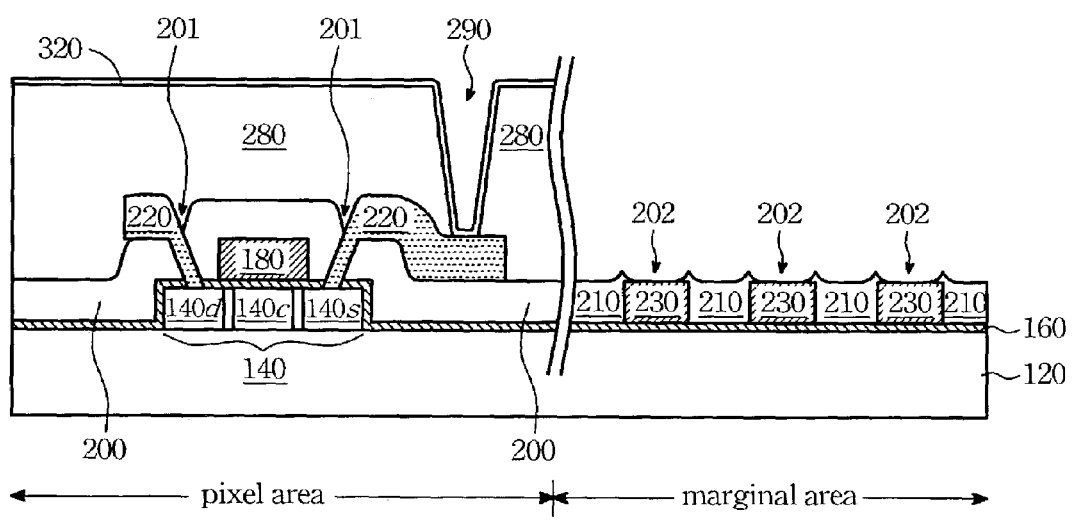
FIG. 7 is a sectional view of an LCD structure in accordance with the present invention.
Figure 8:
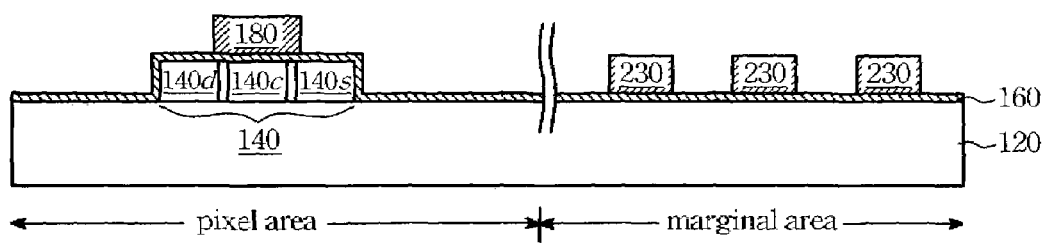
FIGS. 8-10 show a method for making an LCD in accordance with the present invention.
Figure 9:
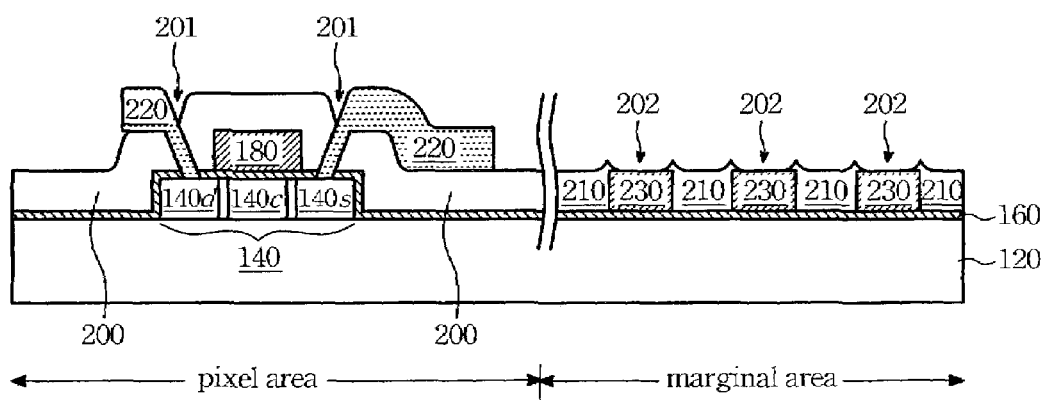

A planarizing film 280 is formed on the ILD layer 200 over pixel area of the goass substrate 120 and covers the interconnections 220. The planarizing film 280 is made of photosensitive materials. A second contact hole 290 is formed in the planarizing film 280 to expose upper surface of the interconnection 220 that is in direct contact with the source region 140s. Referring to FIG. 7, a pixel electrode 320 is formed to cover surfaces of the planarizing film 280, second contact hole 290 and bonding pads 230. It is noted that the pixel electrode 320 attached on the exposed surfaces of the bonding pads 230 is used to enhance surface hardening thereof. The pixel electrode 320 is preferably made of indium tin oxide (ITO).

Thereafter, a first dielectric layer 160 is formed by chemical vapor deposition (CVD) on the glass substrate 120 and covers the silicon-based island 140. A conductive layer is formed on the first dielectric layer 160. Next, the conductive layer is patterned to form a gate 180 over the region 140c sandwiched between the source region 140s and drain region 140d. At the time of forming the gate 180, a plurality of bonding pads 230 are defined on the first dielectric layer 160 over marginal area of the glass substrate 120. In the preferred embodiment of the present invention, the gate 180 and bonding pads 230 are made of metal, polysilicon or any combination thereof. The gate 180, the first dielectric layer 160 and silicon-based island 140 comprise a TFT.

Next, a plurality of first contact holes 201 are formed in the ILD layer 200 and the first dielectric layer 160 over pixel area of the glass substrate 120 to expose portions of the upper surfaces of the source region 140s and drain region 140d, respectively.

Subsequently, a metal layer is formed on the ILD layer 200 and fills the first contact holes 201. The metal layer is then patterned to form a plurality of interconnections 220 in the respective first contact holes 201 to electrically connect to the source region 140s and drain region 140d. In one preferred embodiment of the present invention, the interconnection 220 is made of aluminum, titanium or any combination thereof.

Figure 10:
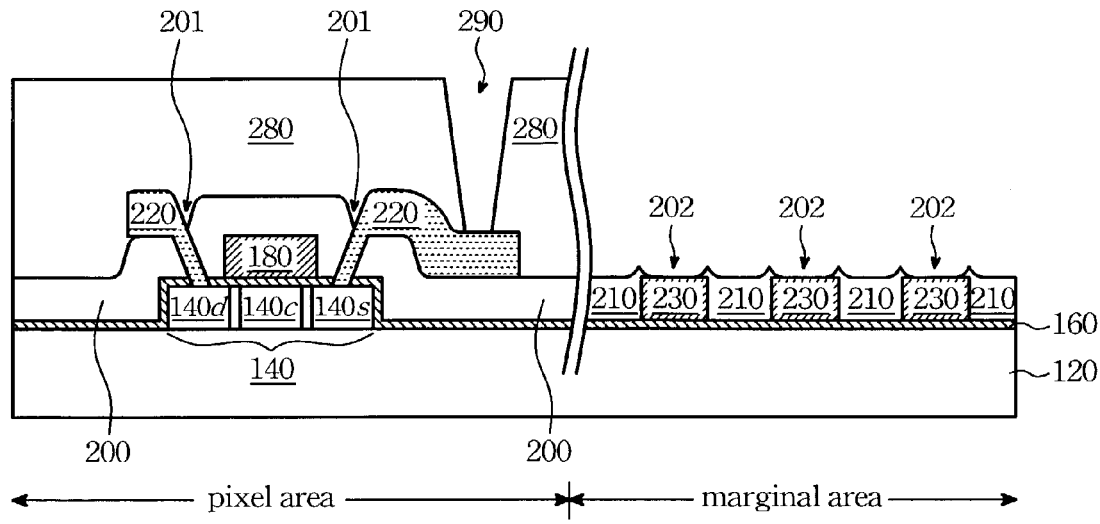

Referring to FIG. 10, a planarizing film 280 is fabricated on the ILD layer 200 over pixel area of the glass substrate 120 and covers the interconnections 220. Thereafter, a second contact hole 290 is formed in the planarizing film 280 to expose a portion of upper surface of the interconnection 220 that is in direct contact with the source region 140s. In a preferred embodiment of the present invention, the planarizing film 280 is made of photosensitive materials. In addition, the second contact hole 290 is formed by development, etching or the combination thereof.

Referring back to FIG. 7, a pixel electrode 320 is formed on the structure of FIG. 10 and covers the surface of the second contact hole 290. Next, the pixel electrode 320 over marginal area of the glass substrate 120 is patterned to remove portions thereof attached on the ILD layer 200. The retained portions of the pixel electrode 320 are used to enhance the surface hardening of the bonding pads 230.

Figure 11:
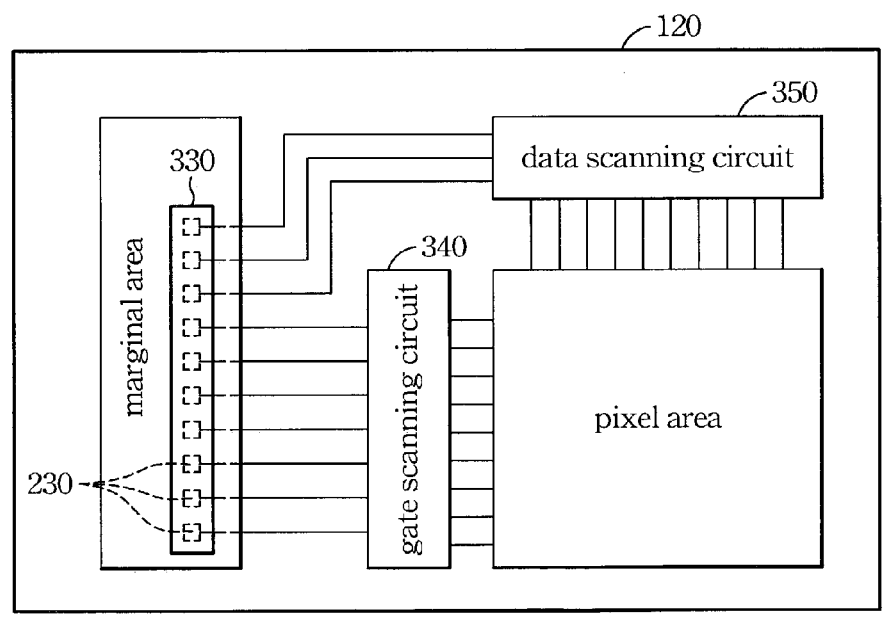
FIG. 11 is a top plan view of an LCD in accordance with the present invention.

Referring to FIG. 11, the bonding pads 230 over marginal area of the glass substrate 120 are electrically connected to the gate (not shown) and interconnections (not shown) formed over pixel area of the glass substrate 120 via a gate scanning circuit 340 and a data scanning circuit 350. Metal bumps of the COG 330 are then mounted to the pixel electrode 320 attached on the bonding pads 230.

In the present invention, the ILD layer originally formed in the prior art is used to insulate the bonding pads, so that the ILD layer does not react with the solution while the re-work process is necessary. That is, the ILD layer does not peel off from the gate oxide film after cleaning the bonding pad structure with the solution.

While the preferred embodiment of the invention has been illustrated and described, it is appreciated that modifications and variations can be made therein without departing from the spirit and scope of the invention. For example, the top gate described in the present invention can be replaced with a bottom gate.

What is claimed is:

1. A LCD panel, which comprises a thin film transistor and a bonding pad structure on a glass substrate, the thin film transistor is formed on pixel area of the glass substrate and further comprises:
- a silicon-based island, which comprises a source region, a drain region, and a channel region sandwiched between the source region and the drain region,
- a first dielectric layer covering the silicon-based island,
- a gate arranging on a portion of the first dielectric layer over the channel region,
- a second dielectric layer covering the gate, the second dielectric layer comprises a plurality of contact holes which exposes the source region and the drain region,
- a plurality of interconnection in the contact hole to electrically connect to the source region and the drain region; and the bonding pad structure is defined on marginal area of the glass substrate and further comprises:
- a plurality of bonding pads, directly defined on the first dielectric layer, for electrically connecting metal bumps;
- a plurality of insulations sandwiched between the bonding pads on the marginal area of the substrate.

2. A LCD panel according to claim 1, wherein the gate comprises a top gate.

3. A LCD panel according to claim 1, wherein the bonding pads are made of metal, polysilicon or any combination thereof.

4. A LCD panel according to claim 1, wherein the insulations are made of SiO, SiN or any combination thereof.

5. A LCD panel according to claim 1, wherein the first dielectric layer is an oxide film.

6. A LCD panel, which comprises a thin film transistor and a bonding pad structure on a glass substrate, the thin film transistor is formed on pixel area of the glass substrate and further comprises:
- a silicon-based island, which comprises a source region, a drain region, and a channel region sandwiched between the source region and the drain region,
- a first dielectric layer covering the silicon-based island,
- a gate arranging on a portion of the first dielectric layer over the channel region; and the bonding pad structure directly defined on marginal area of the glass substrate and further comprises:
- a plurality of bonding pads, defined on the first dielectric layer, for electrically connecting metal bumps;
- a plurality of insulations sandwiched between the bonding pads on the marginal area of the substrate, wherein the LCD panel further comprises a second dielectric layer covering the gate and the bonding pads.

7. A LCD panel according to claim 6 further comprises a plurality of interconnection in the contact hole to electrically connect to the source region and the drain region.

8. A LCD panel according to claim 6, wherein the gate comprises a top gate.

9. A LCD panel according to claim 6, wherein the bonding pads are made of metal, polysilicon or any combination thereof.

10. A LCD panel according to claim 6, wherein the insulations are made of SiO, SiN or any combination thereof.

11. A LCD panel according to claim 6, wherein the first dielectric layer is an oxide film.

* * * * *